Aug. 12, 1969
P. A. WILKS, JR
3,460,893
APPARATUS FOR ANALYZING A CONTINUOUSLY MOVING
STRIP BY MEANS OF ATTENUATED
TOTAL REFLECTION
Filed Sept. 15, 1965
2 Sheets-Sheet 1
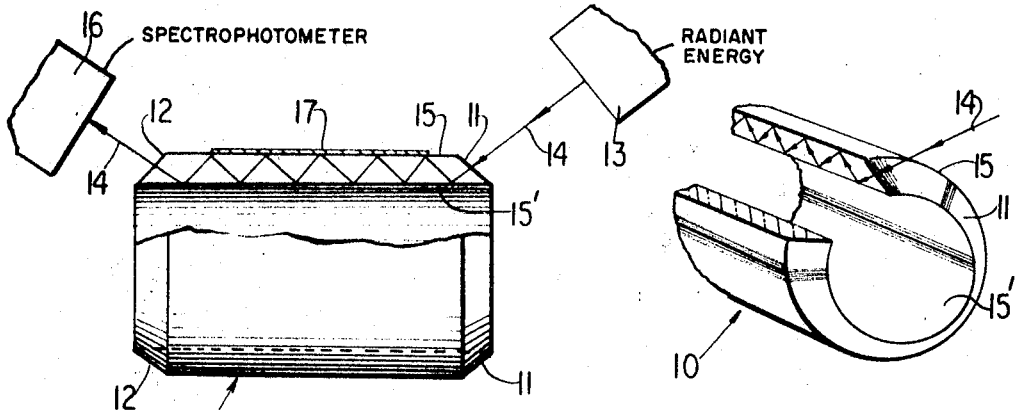
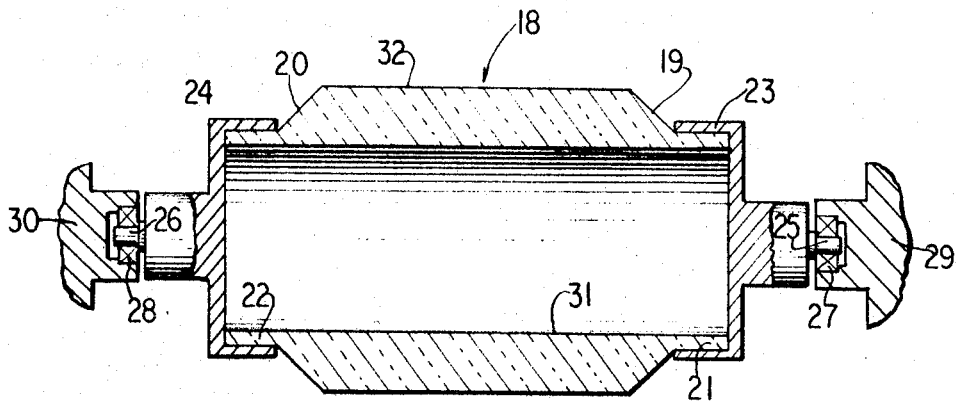
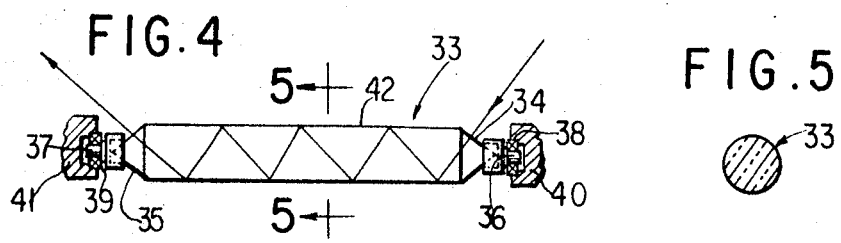
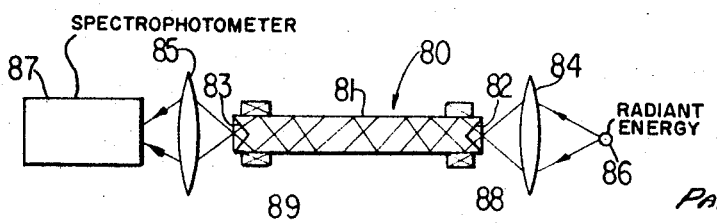
INVENTOR
PAUL A. WILKS, JR.
BY
Robertson Smythe & Bryan
ATTORNEYS

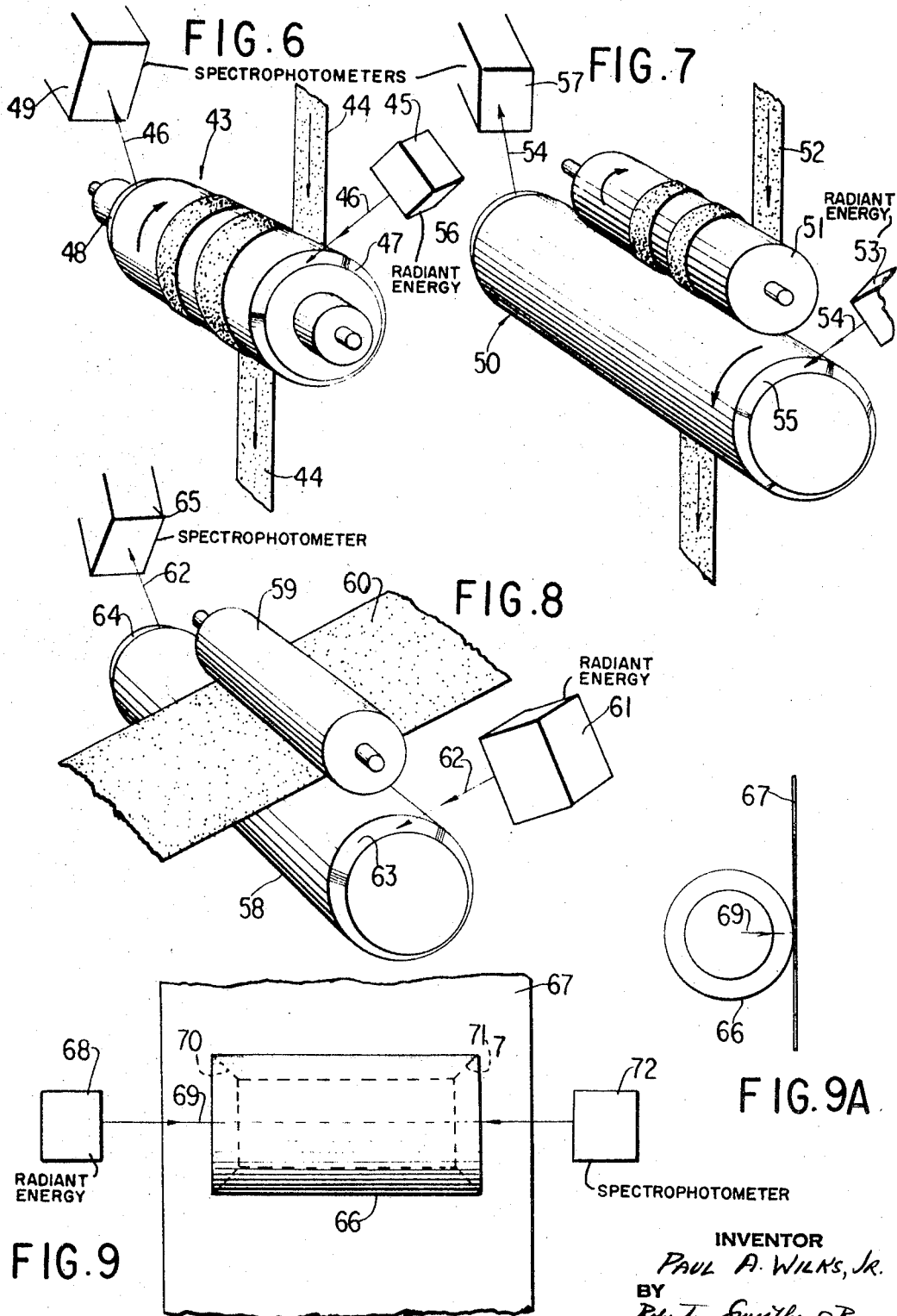

United States Patent Office

3,460,893
Patented Aug. 12, 1969

3,460,893
APPARATUS FOR ANALYZING A CONTINUOUSLY MOVING STRIP BY MEANS OF ATTENUATED TOTAL REFLECTION
Paul A. Wilks, Jr., Darien, Conn., assignor to Wilks Scientific Corporation, Norwalk, Conn., a corporation of Connecticut
Filed Sept. 15, 1965, Ser. No. 487,515
Int. Cl. G01j 3/42
U.S. Cl. 356—96          7 Claims

ABSTRACT OF THE DISCLOSURE

An apparatus having a rotatable cylindrical element having multiple internal reflection characteristics and with beveled ends wherein the strip of material to be analyzed is moved in contact with the cylinder as it rotates. A source of radiant energy is passed into one of the beveled ends and a spectrophotometer receives the rays of energy as they emerge from the other beveled end to produce a spectrum for continuously analyzing the material of the strip such as a web, film or ribbon.

---

This invention relates to spectroscopy, and particularly to an improved system for continuously analyzing a moving web, film or ribbon with radiant energy such as infrared.

Internal reflection spectroscopy is based on a portion of the energy in a radiation beam being totally internally reflected, escaping from the reflecting medium and then being returned into the medium with each reflection. If an absorbing sample is brought into contact with the medium, radiation will be absorbed at wave lengths where the sample absorbs in much the same fashion as in transmission spectroscopy.

The amount of absorption of energy by the sample depends upon the reflective indices of refraction of a transmitting medium in the range, the angle of incidence of the radiation beam as it strikes the reflecting surface, and the number of reflections the radiation beam makes off the reflecting face or faces of the reflecting medium in contact with the sample.

It has been proposed to employ a single plate for the transmitting medium, having opposed beveled edges and parallel faces extending therebetween. A ray of the source is arranged to strike one of the beveled faces at an angle greater than the critical angle, causing the ray to be transmitted into the transmitting medium, less a reflection loss which is a function of the index of refraction of the medium. When the radiation beam reaches one of the parallel faces, it will strike that face at less than the critical angle and will be totally internally reflected to the other parallel face. Again, the beam will be totally reflected back to the initial face, and so forth, along the medium until it reaches the beveled edge opposite that at which the radiation beam entered the medium, at which point it will pass out of the plate medium.

If a sample of material is brought into contact with exposed parallel faces of the plate, the beam will penetrate a small amount (in the order of the wave length of the radiation) into the sample with each reflection. The radiation will be absorbed at those wave lengths where the sample absorbs. Since the penetration into the sample is so slight, the amount of absorption is small but may be multiplied by the number of reflections.

While the above-discussed structure is satisfactory for stationary films or samples to be analyzed, it is not suitable for continuously moving webs, films or ribbons.

The principal object of the invention is to provide a system of internal reflection spectroscopy that will overcome the above and other difficulties of known systems.

Another object of the invention is to provide an internal reflection cell capable of instantaneously producing a spectrum incident to the absorption of wave lengths from a ray of radiant energy as a sample of web, film, ribbon or the like continuously moves past a point in a plane containing the reflected rays of radiant energy.

Still another object of the invention is to provide from a continuously moving web, film or ribbon device, the analysis of which is desired, an infrared spectrum of the material as the web, film or ribbon continuously moves past a point of analysis.

Another object of the invention is to provide such a system in which the infrared spectrum is unaffected by the thickness of the web, film or ribbon.

Still another object of the invention is to provide such a system in which uniform contact of the sample of web, film or ribbon with the reflecting face of a cell is assured.

In one aspect of the invention, an internal reflection cell may be composed of a hollow, cylindrical crystal member having the capability of total internal reflection. The crystal may be thallium bromide, iodide and germanium or any other transmitting material.

In another aspect of the invention, the hollow, cylindrical crystal may have beveled edges that are opposed to each other.

In still another aspect of the invention, a source of radiant energy may be located in position to direct rays thereof onto one of the beveled ends of the hollow, cylindrical crystal at an angle greater than the critical angle, causing the ray to be transmitted into the transmitting crystal, less a reflection loss which is a function of the index of refraction of the crystal. When the radiation beam reaches the internal surface of the hollow cylindrical crystal, it will strike that face at an angle less than the critical angle and will be totally internally reflected to the outer cylindrical face of the hollow, cylindrical crystal. Here again, the beam will be totally reflected back to the initial face, down the crystal until it reaches the beveled edge opposite that at which the radiation beam entered the crystal, at which point it will pass out of the cylindrical crystal.

In a further aspect of the invention, the hollow, cylindrical crystal may be mounted in journal bearings so that it is free to rotate.

In a still further aspect of the invention, a web, film or ribbon of a material to be analyzed may be spirally wrapped around the hollow, cylindrical crystal so that it is payed on and off continuously.

In a still further aspect of the invention, a spectrophotometer may be located in a manner to receive the rays of radiant energy as they pass from the hollow, cylindrical crystal and wherein a spectrum is produced that can be compared with known spectra for analyzing the uniformity or other characteristics of the web, film or ribbon.

In another aspect of the invention, the web, film or ribbon may be passed tangentially over the cylindrical crystal with an idler roller that is urged into contact with the film and cylinder along an axial line that is parallel to that in which the ray of energy travel through the cylindrical crystal.

In a further aspect of the invention, the idler roller may have the ribbon or web spiralled around it, rather than around the cylindrical crystal.

In a still further aspect of the invention, the crystal may be a solid cylinder having beveled edges, in which case the rays of radiant energy as they pass into the solid, cylindrical crystal, are reflected from one internal surface to the other as they pass through the cylinder in the same fashion that they do with respect to the hollow, cylindrical crystal.

In a still further arrangement, the cylinder may have hollow conical end shapes.

The above, other objects and novel features of the invention will become apparent from the following specification and accompanying drawings which are merely exemplary.

In the drawings:

FIG. 1 is a hollow, cylindrical internal reflection cell to which the principles of the present invention have been applied;

FIG. 2 is a perspective view of the crystal shown in FIG. 1;

FIG. 3 is a sectional elevational view of the hollow, cylindrical crystal to which the principles of the invention have been applied, and in which the crystal is mounted for rotation in a journal bearing;

FIG. 4 is a modified form of the crystal, showing it as a solid, cylindrical member journaled in bearings;

FIG. 5 is a sectional view taken substantially along line 5—5 of FIG. 4;

FIG. 6 is a perspective view of a crystal embodying the principles of the invention, and in which a web, film or ribbon is shown spirally wound about it;

FIG. 7 is another manner of using the cell with the ribbon, web or film spirally wound about an idler roll that is maintained in axial contact with a cylindrical crystal;

FIG. 8 is another manner of using the crystal in which the continuously moving ribbon, web or film is held in tangential contact with the cell by an idler roller;

FIGS. 9 and 9A are views of another use to which the crystal of the present invention may be put; and FIG. 10 is another modified form of the invention.

Referring to the drawings, and particularly to FIGS. 1 to 3, the principles of the invention are shown as applied to a hollow, cylindrical crystal 10 having beveled edges 11 and 12. The crystal 10 may be made of a material which has the capability of total internal reflection.

A source of radiant energy 13 may be arranged so that a ray 14 therefrom strikes the beveled edge 11 at an angle greater than the critical angle so that the ray passes into the annulus of the crystal 10, striking the internal surface 15 thereof at an angle less than the critical angle and hence being totally reflected to the outer surface 15 of the crystal 10, from which it is totally reflected back to the surface 15, and so on until it emerges from the beveled edge 12 and is directed into a spectrophotometer 16 where a spectrum is produced which is affected by the absorption of a material 17 to be analyzed that lies in contact tangentially with the crystal 10. The radiant energy may, for example, be infrared.

As the ray 14 passes through the crystal 10, the beam will penetrate a small amount (in the order of the wave length of the radiation) into the sample 17 with each reflection. The radiation will be absorbed at those wave lengths where the sample absorbs. Since the penetration into the sample is very slight, the amount of absorption is small but is multiplied by the number of reflections of the beam.

The result of the radiant beam passing into the spectrophotometer 16 is to provide a well defined continuous spectrum as the web, film or ribbon continuously passes the point on the crystal in the plane of the radiant energy passing through the crystal. The continuous spectrum may be compared with a conventional transmission curve in order to detect desirable or undesirable characteristics of the web, film or ribbon as it continuously moves past the radiant energy beam.

Referring to FIG. 3, a hollow, cylindrical crystal 18 includes opposed beveled surfaces 19 and 20 as well as cylindrical ends 21 and 22. Ends 21 and 22 are rigidly secured to cup-shaped elements 23 and 24 having trunnions 25, 26 that are journaled in antifriction bearings 27, 28 mounted in supporting means 29 and 30.

The crystal 18 includes internal cylindrical surface 31 and exterior cylindrical surface 32. The rays of radiant energy are adapted to be directed onto the beveled surface 19 at an angle greater than the critical angle so that the energy passes into the crystal 18, totally reflecting from surface 31 to surface 32 and back again to surface 31, and so on until it exits from the beveled surface 20 in the same manner that the radiant energy beam 14 passes through the crystal 10 of FIG. 1.

Referring to FIGS. 4 and 5, the principles of the invention are shown as applied to a solid, cylindrical crystal 33 having conical ends 34 and 35 that are rigidly fixed to trunnions 36 and 37 journaled in antifriction bearings 38, 39 mounted in rigid supports 40, 41. In the embodiment shown in FIG. 4, the ray of radiant energy enters the crystal through the conical end surface 34 at an angle greater than the critical angle so that it passes into the solid, cylindrical crystal 33 and reflects back and forth between the cylindrical surface 42 of the member 33 within a plane including the ray of radiant energy entering the conical end surface 34. As the radiant energy passes through the solid, cylindrical crystal 33, it exits from the conical surface 35 still in the same plane of the entering radiant energy beam, and passes into a spectrophotometer such as 16 shown in FIG. 1.

Referring to FIG. 6, a crystal 43 is shown mounted for rotation about a horizontal axis. A web, film or ribbon 44 is shown spirally wound about the crystal 43, and a light source 45 directs a beam of radiant energy 46 onto a beveled surface 47 of the crystal 43. The radiant energy beam 46 totally internally reflects back and forth between the two cylindrical surfaces of the cell 43 and exits from a beveled surface 48, passing into spectrophotometer 49. As the web 44 continuously moves, it rotates cell 43 while the radiant beam 46 remains in the same radial plane. Thus, there is a continuous absorption within the wave length that the web 44 absorbs and produces a spectrum within the spectrophotometer 49 which can be compared with known curves to determine the condition of the web or ribbon 44 as it passes around the cell 43. The spectrophotometer may be any well known type such as the Model 21 made by Perkin-Elmer Corporation.

Referring to FIG. 7, a cell 50 similar to cell 43 has mounted above it an idler roller 51 about which roller 51 a ribbon 52 is spiralled and which continuously moves. The friction between the ribbon 52 and the cell 50 causes the latter to rotate, thereby to eliminate any friction between the cell 50 and the continuously moving ribbon 52. A source of radiant energy 53 directs a radiant beam 54 onto a beveled edge 55 of the cell 50 within a plane that includes the axis of the idler roller 51 and the cell 50. The radiant beam 54, of course, reflects back and forth throughout the cell 50 and exits from a beveled surface 56 of cell 50 and is received by a spectrophotometer 57.

Referring to FIG. 8, a cylindrical cell 58 is mounted for free rotation, and an idler roll 59 is mounted so that it rests in axial contact with the periphery of cell 58. A sheet, web or film 60 is adapted to be drawn between idler roll 59 and the cell 58, while a source of radiant energy 61 directs a ray of radiant energy 62 onto a beveled surface 63 of the cell 58. As the radiant beam 62 reflects back and forth within cell 58, it finally exits from a beveled surface 64 on cell 58 and is received by a spectrophotometer 65.

Referring to FIGS. 9 and 9A, a cell 66 is mounted for rotation about a horizontal axis, and in this instance a web, film or ribbon 67 merely makes an area contact with the cell 66 which extends peripherally about the cell for a slight distance just sufficient to effect the rotation of cell 66 by the movement of the web past it. A source of radiant energy 68 directs a beam 69 onto a beveled edge 70 of the cell 66, and it reflects back and forth through the cell, exiting from a beveled edge 71 and is received by a spectrophotometer 72.

Referring to FIG. 10, the elements are similar to the previously described embodiment of FIG. 9 except that the end beveled surfaces 82, 83 are in a solid crystal as in FIG. 4. The arrangement is shown generally at 80 with a solid rotatable cylindrical element 81 carried in journals 88, 89. Lens 84, 85 direct energy from 86 to the spectrophotometer 87.

What is claimed is:

1. Apparatus for producing a spectrum for the purpose of analyzing a continuously moving strip of material, comprising in combination, a cylindrical element made from a material exhibiting total internal reflection, said cylindrical element including opposed beveled ends; means for mounting said element for rotation; a source of radiant energy arranged to direct radiant energy rays onto one of said beveled ends at an angle greater than the critical angle of the material from which said element is made; means for continuously moving said strip in contact with said cylindrical element as it rotates; and a spectrophotometer arranged at the opposite end of element for receiving said rays of radiant energy as they element from the beveled end of said element opposite that to which the source rays are applied.

2. Apparatus for producing a spectrum for the purpose of analyzing a continuously moving strip of material, comprising in combination, a hollow cylindrical element made from a material exhibiting total internal reflection, said cylindrical element including opposed beveled ends; means for mounting said element for rotation; a source of radiant energy arranged to direct radiant energy rays onto one of said beveled ends at an angle greater than the critical angle of the material from which said element is made; means for continuously moving said strip in contact with said cylindrical element as it rotates; and a spectrophotometer arranged at the opposite end of said element for receiving said rays of radiant energy as they emerge from the beveled end of said element opposite that to which the source rays are applied.

3. Apparatus for producing a spectrum for the purpose of analyzing a continuously moving strip of material, comprising in combination, a solid cylindrical element made from a material exhibiting total internal reflection, said cylindrical element including opposed beveled ends; means for mounting said element for rotation; a source of radiant energy arranged to direct radiant energy rays onto one of said beveled ends at an angle greater than the critical angle of the material from which said element is made; means for continuously moving said strip in contact with said cylindrical element as it rotates; and a spectrophotometer arranged at the opposite end of said element for receiving said rays of radiant energy as they emerge from the beveled end of said element opposite that to which the source rays are applied.

4. Apparatus for producing a spectrum for the purpose of analyzing a continuously moving strip of material, comprising in combination, a cylindrical element made from a material exhibiting total internal reflection, said cylindrical element including opposed beveled ends; means for mounting said element for rotation; a source of radiant energy arranged to direct radiant energy rays onto one of said beveled ends at an angle greater than the critical angle of the material from which said element is made; a spectrophotometer arranged at the opposite end of said element for receiving said rays of radiant energy as they emerge from the beveled end of said element opposite that to which the source rays are applied; and strip means spirally wound about said element so that said strip may be continuously payed on and off said element.

5. Apparatus for producing a spectrum for the purpose of analyzing a continuously moving strip of material, comprising in combination, a cylindrical element made from a material exhibiting total internal reflection, said cylindrical element including opposed beveled ends; means for mounting said element for rotation; a source of radiant energy arranged to direct radiant energy rays onto one of said beveled ends at an angle greater than the critical angle of the material from which said element is made; a spectrophotometer arranged at the opposite end of said element for receiving said rays of radiant energy as they emerge from the beveled end of said element opposite that to which the source rays are applied; and a roller mounted for rotation about an axis parallel to that of said element, in contact therewith and said axes being in the same plane as the radiant energy rays, said roller pressing said strip against said cylindrical element as the strip is continuously moved.

6. Apparatus for producing a spectrum for the purpose of analyzing a continuously moving strip of material, comprising in combination, a cylindrical element made from a material exhibiting total internal reflection, said cylindrical element including opposed beveled ends; means for mounting said element for rotation; a source of radiant energy arranged to direct radiant energy rays onto one of said beveled ends at an angle greater than the critical angle of the material from which said element is made; a spectrophotometer arranged at the opposite end of said element for receiving said rays of radiant energy as they emerge from the beveled end of said element opposite that to which the source rays are applied; a roller mounted for rotation about an axis parallel to that of said element, in contact therewith and said axes being in the same plane as the radiant energy rays; and a strip spirally wound about said roller so that said strip may be continuously payed on and off said roller.

7. Apparatus for producing a spectrum for the purpose of analyzing a continuously moving strip of material, comprising in combination, a cylindrical element made from a mateiral exhibiting total internal reflection, said cylindrical element including opposed beveled ends; means for mounting said element for rotation; a source of radiant energy arranged to direct radiant energy rays onto one of said beveled ends at an angle greater than the critical angle of the material from which said element is made; a spectrophotometer arranged at the opposite end of said element for receiving said rays of radiant energy as they emerge from the beveled end of said element opposite that to which the source rays are applied; a roller mounted for rotation about an axis parallel to that of said element, in contact therewith and said axes being in the same plane as the radiant energy rays; and a strip located between said element and roller so that said strip may be continuously drawn past said point of contact between said roller and element.

References Cited

UNITED STATES PATENTS

| | | | |
|---|---|---|---|
| 2,719,235 | 9/1955 | Emerson | 88—14 X |
| 2,947,212 | 8/1960 | Woods. | |
| 3,222,615 | 12/1965 | Holly | 350—96 X |
| 3,308,709 | 3/1967 | Harrick | 350—96 X |
| 3,321,714 | 5/1967 | Tien | 331—94.5 |
| 3,363,107 | 1/1968 | Martin. | |

OTHER REFERENCES

Harrick: "Multiple Reflection Cells for Internal Reflection Spectrometry," Analytical Chemistry, vol. 36, No. 1, January 1964, pp. 188–191.

RONALD L. WIBERT, Primary Examiner

F. L. EVANS, Assistant Examiner

U.S. Cl. X.R.

250—83; 350—96; 356—199